Oct. 13, 1925.
F. W. RYAN
1,557,096
SHOCK ABSORBER FOR VEHICLE SPRINGS
Filed June 11, 1923    2 Sheets-Sheet 2
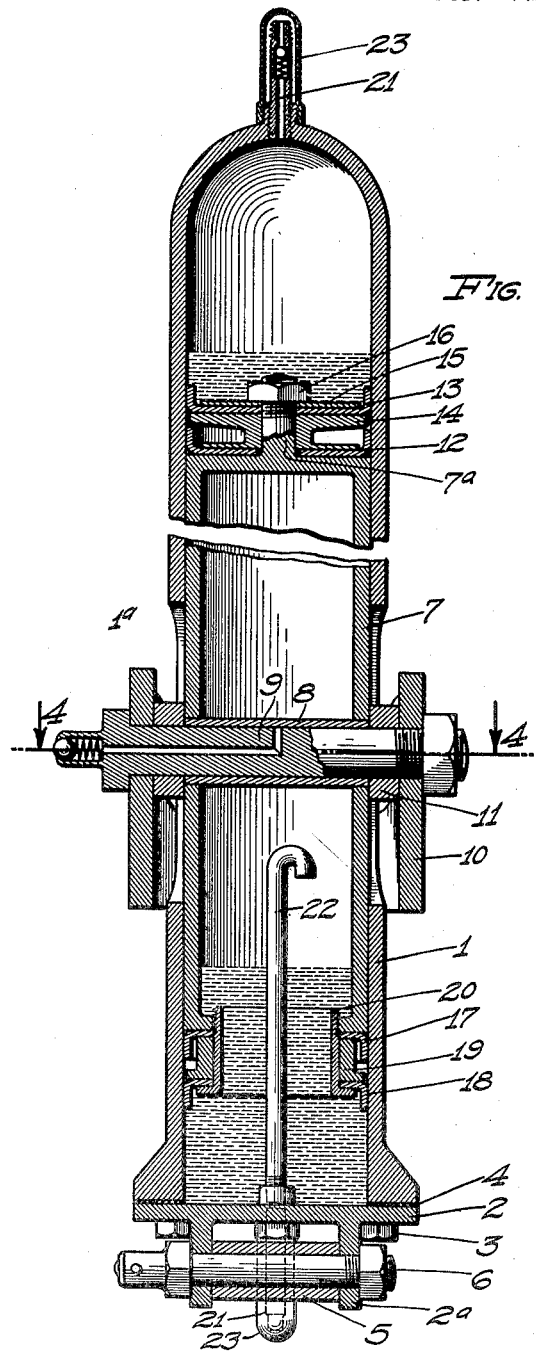
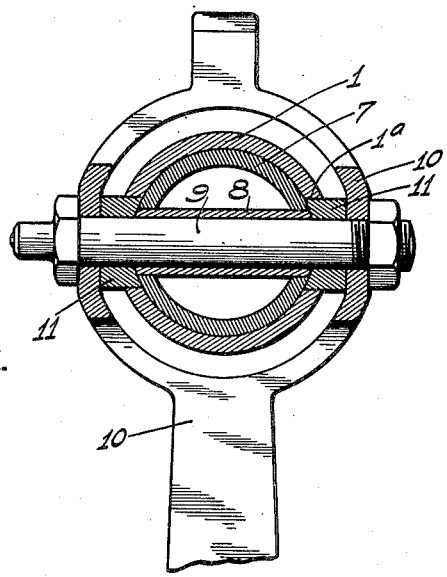
Inventor
FRANK W. RYAN.
By A. B. Bowman
Attorney Patented Oct. 13, 1925.

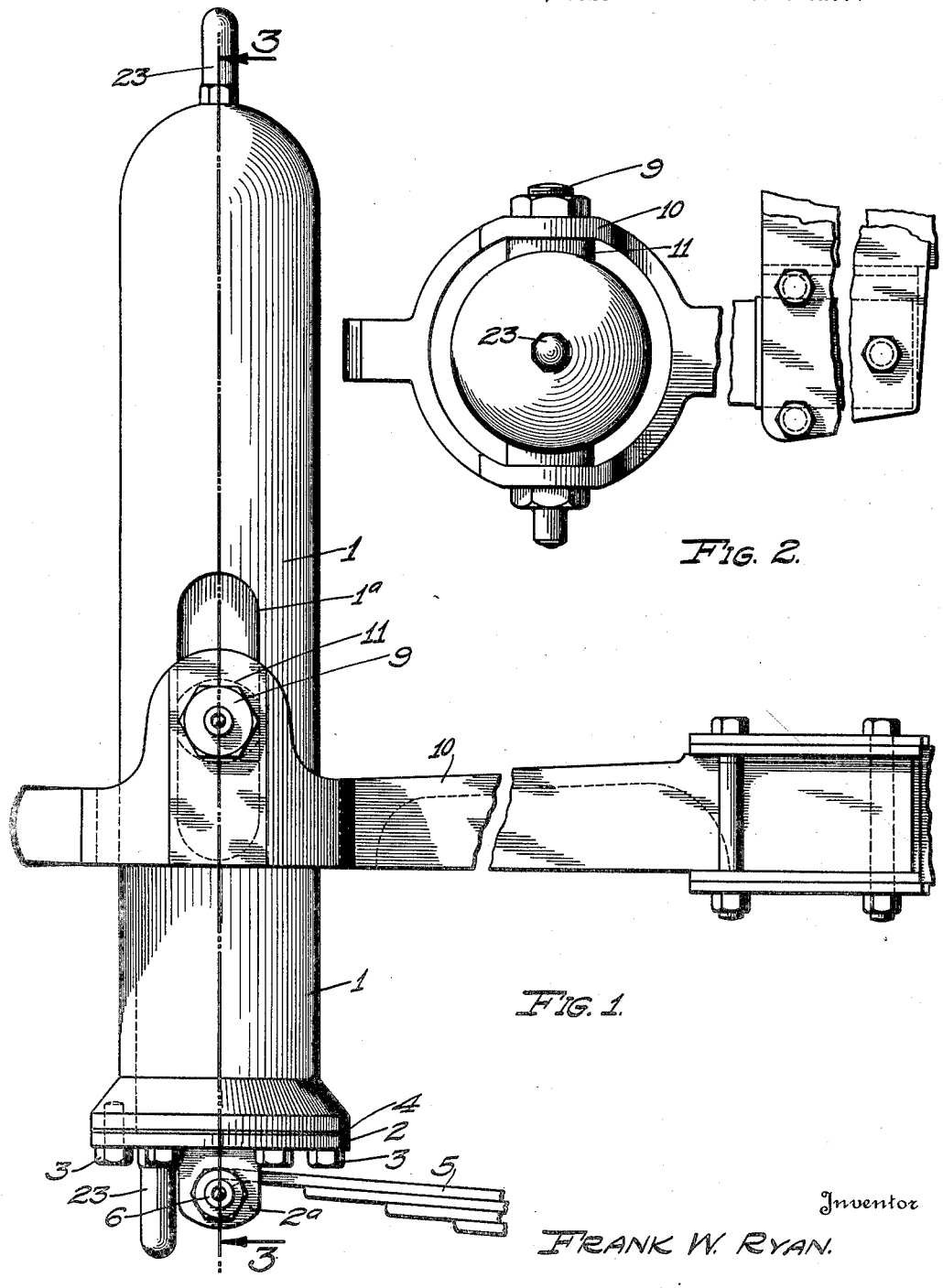

1,557,096

UNITED STATES PATENT OFFICE.

FRANK W. RYAN, OF SAN DIEGO, CALIFORNIA.

SHOCK ABSORBER FOR VEHICLE SPRINGS.

Application filed June 11, 1923. Serial No. 644,668.

*To all whom it may concern:*

Be it known that I, FRANK W. RYAN, a citizen of the United States, residing at San Diego, in the county of San Diego and State of California, have invented a certain new and useful Shock Absorber for Vehicle Springs, of which the following is a specification.

My invention relates to shock absorbers for vehicles, particularly to shock absorbers of the air and oil type, and the objects of my invention are: First, to provide a shock absorber of this class in which the compression or flexure of the vehicle springs due to impact against the vehicle wheels, and the recoil or reaction thereof and of the vehicle, is checked or dampened by means of the fluid in two opposed compressed air chambers, the fluid in one acting against the compression due to the impact, and the other against the reaction of the spring; second, to provide a shock absorber of this class which absorbs to a great extent the action, reaction and vibration of the springs of the vehicle and other action normally directed against the frame and body of the vehicle, resulting in easy riding conditions of the vehicle; third, to provide a shock absorber which will permit better and greater action of the vehicle springs, and therefore greater resiliency of the vehicle when passing over rough roads, thus reducing to a minimum the wear and tear on the vehicle; fourth, to provide a shock absorber of this class in which the vehicle frame is constantly supported by a compressed fluid and wholly supported against said sustaining fluid by an oppositely directed force of other compressed fluid, thus tending to hold the vehicle frame and body in a downward position, preventing the tendency of the leaves of the conventional vehicle spring to separate and holding the main leaf of the spring against the supporting or reinforcing leaf when turning corners and the like; fifth, to provide a novelly constructed shock absorbing mechanism for vehicles, and sixth, to provide a shock absorber which is very simple and economical of construction, durable, reliable, efficient, particularly compact, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my shock absorber, pivotally supported on the vehicle frame and pivotally connected to the vehicle spring, showing the frame and spring fragmentarily; Fig. 2 is a plan view thereof; Fig. 3 is a longitudinal sectional view thereof, taken through 3—3 of Fig. 1, showing certain parts and portions in elevation to facilitate the illustration, and Fig. 4 is a transverse sectional view thereof, taken through 4—4 of Fig. 3.

Like characters of reference refer to similar parts and portions throughout the several views of the drawings.

The cylinder 1, head member 2, screws 3, gasket 4, vehicle spring 5, bolt 6, piston 7, sleeve 8, bolt 9, bracket 10, spacers 11, piston leathers 12 and 13, spacer 14, washer 15, nut 16, piston leathers 17 and 18, spacer 19, leather retaining member 20, valves 21, tube 22, and the valve caps 23, constitute the principal parts and portions of my invention.

My shock absorbing mechanism, as disclosed in the drawings, is particularly adapted to take the place of the conventional cantilever leaf spring supported on the vehicle frame and connected at its free end with another leaf spring; however, the mechanism may be used to connect the vehicle springs to the frame in any other convenient manner if desired.

The shock absorber consists mainly of a cylinder 1 and a piston 7 reciprocally mounted therein. The normally upper end of the cylinder 1 is closed and at the lower end is provided a head member 2, secured to the cylinder by means of the screws 3, there being provided a gasket 4 between the cylinder and the head member to seal the joint. The head member 2 is provided with a pair of downwardly extending lugs 2ᵃ through which extends the bolt 6 and pivotally supports the one end of the leaf spring 5 thereon and relatively to the head member 2, substantially as shown in the drawings. Within the cylinder 1 is reciprocally mounted the hollow, cupped piston 7, which is pivotally connected to and mounted in an enlarged annular portion near the end of the supporting bracket 10 by means of the bolt 9 extending through a sleeve 8 extending transversely through the piston intermediate its ends and secured thereto. The piston is centrally positioned in the annular portion of the supporting arm 10 by means of the spacers 11, positioned between the annular portion of the supporting bracket and the piston, and through which the bolt 9 extends. The spacers 11 are reciprocally mounted in the longitudinally slotted portions 1$^a$ in the wall of the cylinder through which the bolt 9 extends, thereby guiding the cylinder 1 and retaining the same in alignment with the piston 7 and the vehicle frame.

The supporting bracket 10 is supported in a U-shaped member secured to the vehicle frame by means of a plurality of bolts, substantially as shown in the drawings.

The piston 7 is provided at its upper end with an upwardly extending, threaded boss 7$^a$, over which are positioned the piston leathers 12 and 13, with the flange portion at the periphery extending upwardly. Said leathers 12 and 13 are separated by means of a spacer 14, which spacer also retains the one piston leather 12 in position against the end of the piston 7. The washer 15 is positioned against the outer piston leather 13 and secured in position by the nut 16 screwed on the threaded boss 7$^a$ of the piston 7, thus forming a double sealing means at the upper end of the piston between the same and the cylinder 1. The piston 7 is made hollow and open at its lower end, at which end are secured the inverted piston leathers 17 and 18, spaced from each other by the spacer 19 and secured together and to the lower end of the piston 7 by means of the hollow leather retaining member 20.

It will be noted that there are formed two air chambers, one above the piston 7 and the other within the same, or on the opposite side of the head of the piston, the chambers being separated from each other by the head of the piston. Said chambers are partially filled with oil or a suitable liquid so that the joint between the piston and the cylinder wall will be effectively sealed.

I have provided spring and pressure actuated valves 21 communicating with each of said chambers so that the air therein may be released when desired, or the pressure increased, if necessary. The lower valve 21, being positioned below the level of the oil within the chamber, is provided with an extended tube 22, which extends from the valve upwardly above the level of the oil in the lower chamber. I have also provided caps 23, which are adapted to be secured around the valves for protecting the same and preventing dirt from getting into the mechanism.

It is obvious from this construction as illustrated in the drawings and set forth in the specification that there is provided a structure aimed at and set forth in the objects of the invention, and though there is shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A shock absorber of the class described, including a cylinder and a hollow cup shaped piston open at one end and closed at its other end reciprocally mounted therein, one being supported intermediate its ends by a vehicle frame, and the other pivotally connected at one end to a spring of said vehicle.

2. A shock absorber of the class described, including a cylinder and a piston reciprocally mounted therein, one being supported intermediate its ends by a vehicle frame, and the other pivotally connected at one end to a spring of said vehicle, said piston being hollow throughout its length and open at one end, the other end thereof being closed and serving as a separating wall within the cylinder and forming two compression chambers.

3. A shock absorber of the class described, including a cylinder and a piston reciprocally mounted therein, one being supported intermediate its ends by a vehicle frame, and the other pivotally connected at one end to a spring of said vehicle, said piston being open at one end and hollow to the other end, the other end thereof serving as a separating wall within the cylinder and forming two compression chambers, and cup washers positioned at both ends of said piston engaging the wall of said cylinder.

4. A shock absorber of the class described, including a cylinder and a piston reciprocally mounted therein, one being supported intermediate its ends by a vehicle frame, and the other pivotally connected at one end to a spring of said vehicle, said piston being hollow throughout its length and open at one end, the other end thereof being closed and serving as a separating wall within the cylinder and forming two compression chambers, cup washers positioned at both ends of said piston engaging the wall of said cylinder, oil positioned in each of said chambers, and valves communicating with each of said chambers above the level of the oil therein.

5. A shock absorber of the class described, including a cylinder and a piston reciprocally mounted therein, one being supported by a vehicle frame and the other pivotally supported by a spring of said vehicle, said piston being hollow throughout its length and open at one end, the other end thereof being closed and serving as a separating wall within the cylinder and forming two compression chambers, and cup washers positioned at both ends of said piston engaging the wall of said cylinder.

6. A shock absorber of the class described, including a cylinder and a piston reciprocally mounted therein, one being supported by a vehicle frame and the other pivotally supported by a spring of said vehicle, said piston being hollow and open from one end to the other and the other end thereof being closed and serving as a separating wall within the cylinder and forming two compression chambers, cup washers positioned at both ends of said piston engaging the wall of said cylinder, oil positioned in each of said chambers, and valves connecting with each of said chambers about the level of the oil therein.

7. A shock absorber of the class described, including a cylinder pivotally supported at its one end on a vehicle spring, and a bucket piston hollow from one end to the other reciprocally mounted therein and connected intermediate its ends to the frame of said vehicle, said cylinder being cut away at the connecting portion of said piston with said vehicle frame, the head of said piston forming two compression chambers within said cylinder.

8. A shock absorber of the class described, including a cylinder pivotally supported at its one end on a vehicle spring, a bucket piston hollow from one end to the other reciprocally mounted therein and connected intermediate its ends to the frame of said vehicle, said cylinder being cut away at the connecting portion of said piston with said vehicle frame, the head of said piston forming two compression chambers within said cylinder, and cup washers positioned at both ends of said piston engaging the wall of said cylinder.

9. A shock absorber of the class described, including a cylinder pivotally supported at its one end on a vehicle spring, a bucket piston hollow from one end to the other reciprocally mounted therein and connected intermediate its ends to the frame of said vehicle, said cylinder being cut away at the connecting portion of said piston with said vehicle frame, the head of said piston forming two compression chambers within said cylinder, cup washers positioned at both ends of said piston engaging the wall of said cylinder, the lower portions of said compression chambers being adapted to be filled with oil, and valves communicating with each of said chambers above the level of the oil therein.

10. A shock absorber of the class described, including a cylinder pivotally supported at its one end on a vehicle spring, and a bucket piston with a passage from end to end reciprocally mounted therein and connected intermediate its ends to the frame of said vehicle, said cylinder being cut away at the connecting portion of said piston with said vehicle frame, the head of said piston serving as a separating wall within the cylinder and forming two compression chambers, one above the piston and one within the same.

11. A shock absorber of the class described, including a cylinder pivotally supported at its one end on a vehicle spring, a bucket piston with a passage from end to end reciprocally mounted therein and connected intermediate its ends to the frame of said vehicle, said cylinder being cut away at the connecting portion of said piston with said vehicle frame, the head of said piston serving as a separating wall within the cylinder and forming two compression chambers, one above the piston and one within the same, spaced apart cup washers positioned and secured at the head end of said piston, and other spaced apart cup washers positioned at the lower open end of said piston in engagement with the wall of said cylinder.

12. A shock absorber of the class described, including a cylinder pivotally supported at its one end on a vehicle spring, a bucket piston with a passage from end to end reciprocally mounted therein and connected intermediate its ends to the frame of said vehicle, said cylinder being cut away at the connecting portion of said piston with said vehicle frame, the head of said piston serving as a separating wall within the cylinder and forming two compression chambers, one above the piston and one within the same, spaced apart cup washers positioned and secured at the head end of said piston, other spaced apart cup washers positioned at the lower open end of said piston in engagement with the wall of said cylinder, the lower portions of said chambers being adapted to be filled with oil, and valves communicating with each of said chambers above the level of the oil therein.

13. A shock absorber, including a casing with opposed air chambers therein, a bucket type piston with a passage from end to end reciprocally mounted therein intermediate said chambers, means for supporting said casing, and means on which said piston is supported.

14. A shock absorber, including a casing with opposed air chambers therein, a bucket type piston with a passage from end to end reciprocally mounted therein intermediate said chambers, means for supporting said casing, means on which said piston is supported, and cup washers mounted on each end of said piston facing in opposite directions.

In testimony whereof, I have hereunto set my hand at San Diego, California, this 6th day of June, 1923.

FRANK W. RYAN.